UNITED STATES PATENT OFFICE 2,086,186

TREATMENT OF RUBBER

William E. Messer, Cheshire, Conn., assignor, by mesne assignments, to United States Rubber Company, New York, N. Y., a corporation of New Jersey No Drawing. Application October 10, 1933, Serial No. 692,989

21 Claims. (Cl. 18—53)

This invention relates to the treatment of rubber and to the production of vulcanized rubber goods therefrom. More particularly the invention relates to a new class of vulcanization accelerators.

Broadly the invention comprises treating rubber with an azine sulphide, the azine nucleus embodying four C atoms, one N atom and a member of the oxygen family of the periodic table having an atomic weight of not more than about 32 (sulphur or oxygen).

The type formula is T—$S_n$—Y wherein T represents the azine nucleus, Y represents hydrogen, T, or a salt or ester forming element or group and $n$ is one or a multiple of one. From experimentation the essential grouping in these accelerators appears to be,—a hexocyclic group embodying four C atoms, one N atom, either S or O and having the sulphur of a mercapto group attached to one of the C atoms, represented generally by

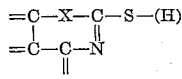

in which the H of the mercapto group is replaceable by metal, or other salt forming group, or ester forming group, or an azine monosulphide or polysulphide grouping of the azine class set forth therein, and X may represent S or O.

The salt forming group may be a metal or an amine including the ammonium or alkyl, aryl or aralkyl substituted ammonium group, and the ester forming groups acyclic, carbocyclic (aromatic or alicyclic) or heterocyclic groups,—exemplified by alkali metals, e. g. K or Na, alkaline earth metals, e. g. Ca, Ba, heavy metals, e. g. zinc, cadmium, lead, iron, etc., alkyl, aralkyl, aryl, acyl, aracyl, polymethylene, etc. The various groups including the groups attached to the azine nucleus may be saturated or unsaturated, substituted or unsubstituted. Certain sub-classes and members thereof are new chemicals as are hereafter claimed. Broadly these compounds are azine sulphides or derivatives thereof.

With this understanding of the non-restrictive character of the invention, the preparation of various members thereof and their properties in rubber are herewith given to further illustrate the invention and to set forth preferred modes of practicing the invention. In the vulcanization tests a base recipe was used comprising by weight

| | Parts |
|---|---|
| Rubber (smoked sheet) | 100 |
| Carbon black | 45 – 50 |
| Zinc oxide | 5 |
| Pine tar | 3.5 |
| Zinc soap of cocoanut oil | 1.25– 3.5 |
| Anti-oxidant | 1 |
| Sulphur | 3.25 |

Example 1

3-mercapto benzo-2-4-1-thiazine having the probable formula

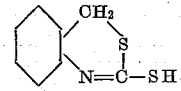

is described by Paal and Commerell B. 27 2430 (1894) and may be made as follows:

14.5 grams of o-amino benzyl alcohol, 22 grams of carbon disulphide, 7.3 grams of potassium hydroxide and 29 grams of ethyl alcohol are refluxed for about 10 hours on a steam bath. The resulting mass is cooled and crystals of the potassium salt of 3-mercapto-benzo-2-4-1-thiazine are filtered off. These crystals are taken up in water and acidified with dilute hydrochloric acid, whereupon fine crystals of the accelerator material separate and are filtered off, washed with water and dried. The yield is about 16 grams of a product having a melting point of 161–3° C. which may be further purified if desired.

1.23 parts by weight of the compound per 100 parts of rubber were incorporated with the base recipe and the stock vulcanized. The tensiles (T) are in pounds per square inch at break and E represents the percent elongation at break. The tests were on unaged and aged stocks.

Tensiles

Unaged

| Stock | T | E |
|---|---|---|
| Cure {20'/30#} | 4,520 | 720 |
| {30'/30#} | 4,630 | 680 |
| {45'/30#} | 4,620 | 640 |
| {60'/30#} | 4,620 | 603 |
| {75'/30#} | 4,410 | 583 |

Aged (48 hours in oxygen bomb) (300 lbs. oxygen maintained at 70° C.)

| | | |
|---|---|---|
| Cure {20'/30#} | 3,900 | 733 |
| {30'/30#} | 3,660 | 656 |
| {45'/30#} | 3,600 | 610 |
| {60'/30#} | 3,590 | 683 |
| {75'/30#} | 3,320 | 513 |

Example 2

2 mercapto-meta-thiazane (2 mercapto-dihydro-meta-thiazine) having the probable formula

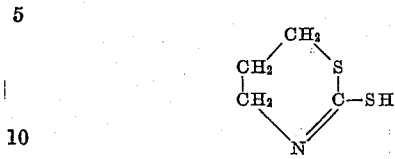

is described by Gabriel and Lauer B. 23, 91-2 and may be made as follows:

50 grams of crude gamma brom propylamine hydro-bromide are taken up in 68 cc. of cold sodium hydroxide (4 normal solution) and 27.2 grams of carbon disulphide are added carefully with cooling. The precipitate is filtered off and dissolved in sodium hydroxide. The alkaline solution is filtered, the filtrate acidified and the precipitate filtered off, washed and dried. About 9 grams of colorless crystals having a melting point of about 128–131° C. are obtained, which may be further purified, if desired.

.975 parts of the compound were incorporated with the base recipe and the stock vulcanized. Tensile data are as follows:

Tensiles

Unaged

| Stock | | T | E |
|---|---|---|---|
| Cure | 20'/30# | 3260 | 706 |
| | 30'/30# | 4030 | 696 |
| | 45'/30# | 4390 | 710 |
| | 60'/30# | 4430 | 683 |
| | 75'/30# | 4400 | 670 |

Aged (48 hours in oxygen bomb) (300 lbs. oxygen maintained at 70° C.)

| Cure | 20'/30# | 3060 | 720 |
|---|---|---|---|
| | 30'/30# | 3250 | 720 |
| | 45'/30# | 3580 | 726 |
| | 60'/30# | 3560 | 696 |
| | 75'/30# | 3560 | 680 |

Example 3

3-mercapto-1-dimethyl benzo-2-4-1-oxazine having the probable formula

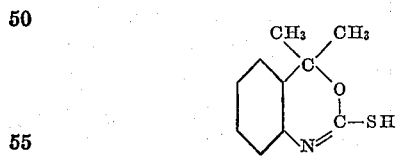

is made as follows:

47 grams of crude ortho amino phenyl dimethyl carbinol are mixed with 54 grams of carbon disulphide, 17.5 grams of potassium hydroxide, and 110 cc. of ethyl alcohol and the mixture is refluxed for about 9 hrs. on a steam bath. The lower oily bottom layer constituting impurities is separated and the alcohol solution evaporated. The residue is taken up in dilute sodium hydroxide, filtered, and the filtrate acidified and the precipitate that separates out filtered off, washed and dried. About 37–42 grams of this new light colored crystalline compound having a melting point of about 131.5–132.5° C. are obtained which may be further purified if desired.

1.41 parts by weight of the new compound per 100 parts by weight of rubber were incorporated with the base recipe and the stock vulcanized. The tensile data are as follows:

Tensiles

Unaged

| Stock | | T | E |
|---|---|---|---|
| Cure | 20'/30# | 4410 | 680 |
| | 30'/30# | 4410 | 580 |
| | 45'/30# | 4100 | 520 |
| | 60'/30# | 4040 | 493 |
| | 75'/30# | 4010 | 483 |

Aged (48 hours in oxygen bomb) (300 lbs. oxygen maintained at 70° C.)

| Cure | 20'/30# | 3920 | 633 |
|---|---|---|---|
| | 30'/30# | 3660 | 533 |
| | 45'/30# | 3220 | 490 |
| | 60'/30# | 3100 | 436 |
| | 75'/30# | 2530 | 400 |

Example 4

3-mercapto-1-oxy-benzo-2-4-1-thiazine having the probable formula

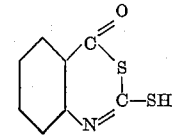

is made as follows:

60 grams of potassium hydroxide, 135 grams of anthranilic acid, 180 grams of carbon disulphide and 300 grams of ethyl alcohol are refluxed for about 5 hrs. Cool and filter off the precipitate, take the precipitate up in water, filter and acidify the filtrate. The precipitate formed is filtered off, washed and dried. This precipitate is recrystallized from alcohol-acetone solution. About 70 grams of the impure compound having a melting point of 213–6° C. are obtained. This new material is about the color of red phosphorus.

1.315 parts of this new material by weight per 100 parts by weight of rubber were incorporated with the base recipe and the stock vulcanized. Tensiles are as follows:

Tensiles

Unaged

| Stock | | T | E |
|---|---|---|---|
| Cure | 20'/25# | 2520 | 670 |
| | 30'/25# | 3540 | 693 |
| | 45'/25# | 3610 | 643 |
| | 60'/25# | 3920 | 640 |
| | 75'/25# | 3760 | 623 |

Aged (48 hours in oxygen bomb) (300 lbs. oxygen maintained at 70° C.)

| Cure | 20'/25# | 2340 | 620 |
|---|---|---|---|
| | 30'/25# | 2760 | 630 |
| | 45'/25# | 2840 | 616 |
| | 60'/25# | 2960 | 600 |
| | 75'/25# | 2500 | 590 |

Example 5

2-mercapto-peri-naphtho-meta oxazine having the probable formula

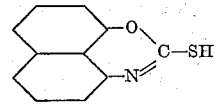

is prepared as follows:

12.7 grams of peri-amino naphthol, 3.8 grams of potassium hydroxide, 20 grams of carbon disulphide, and 40 cc. of ethyl alcohol are refluxed on a steam bath for about 8 hrs. About 200 cc. of water are added and the solution filtered. On acidification the precipitate separates which is filtered off, washed and dried. This crude material is recrystallized from acetone yielding about 13.8 grams of the new light gray chemical having a melting point of about 240° C.

1.25 parts by weight of this new material are incorporated with the base recipe and the stock vulcanized. Tensile data are as follows:

*Tensiles*

Unaged

| Stock | | T | E |
|---|---|---|---|
| Cure | 20'/30# | 1020 | 596 |
| | 30'/30# | 1300 | 640 |
| | 45'/30# | 1420 | 703 |
| | 60'/30# | 1220 | 573 |
| | 75'/30# | 1520 | 620 |

*Aged (48 hours in oxygen bomb) (300 lbs. oxygen maintained at 70° C.)*

| Stock | | T | E |
|---|---|---|---|
| Cure | 20'/30# | 860 | 500 |
| | 30'/30# | 1160 | 500 |
| | 45'/30# | 1240 | 490 |
| | 60'/30# | 1060 | 490 |
| | 75'/30# | 1560 | 480 |

Example 6

2-4-dinitro phenyl-1-dimethyl benzo-2-4-1-oxazine-3-sulphide having the probable formula

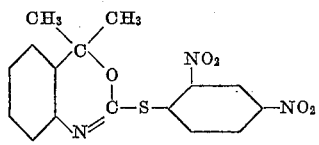

is prepared as follows:

11.2 grams of 3-mercapto-1-dimethyl benzo-2-4-1-oxazine, 2 grams sodium hydroxide and 33 cc. of ethyl alcohol are stirred together until all are in solution. Then 11.3 grams of 2-4-dinitro chlor benzene dissolved in 33 cc. ethyl alcohol are added slowly with agitation. The mixture is then heated and stirred for about 1 hr. The precipitate formed is filtered off, washed with 50 cc. ethyl alcohol and then water and finally dried. About 15.5 grams of this new chemical are obtained as fine yellow crystals with a melting point of 145-6° C. which may be further purified if desired.

2.68 parts of the new chemical per 100 parts by weight of rubber are incorporated with the base recipe and the stock vulcanized. Tensile data are as follows:

*Tensiles*

Unaged

| Stock | | T | E |
|---|---|---|---|
| Cure | 20'/30# | 810 | 466 |
| | 30'/30# | 2780 | 656 |
| | 45'/30# | 3400 | 626 |
| | 60'/30# | 3680 | 610 |
| | 75'/30# | 3920 | 600 |

*Aged (48 hours in oxygen bomb) (300 lbs. oxygen maintained at 70° C.)*

| Stock | | T | E |
|---|---|---|---|
| Cure | 20'/30# | 80 | 416 |
| | 30'/30# | 400 | 426 |
| | 45'/30# | 640 | 450 |
| | 60'/30# | 820 | 470 |
| | 75'/30# | 860 | 460 |

Example 7

Bis (1-dimethyl benzo-2-4-1-oxazine)-3-disulphide having the probable formula

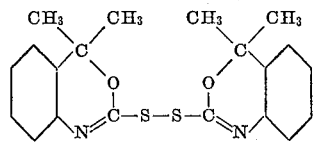

is prepared as follows:

5.5 grams of 3-mercapto-1-dimethyl benzo-2-4-1-oxazine, 2.4 grams of 50% of sodium hydroxide and 160 cc. of water are mixed together and the resulting solution is cooled in an ice and salt bath. A cold solution of 4.2 grams of chlorine, 10.4 grams of 50% sodium hydroxide and 400 cc. of water are added over a period of an hour to the first solution with agitation. Agitation and cooling are continued for about 2 hrs. more. The precipitate of the new chemical is filtered off, washed thoroughly and dried. About 4.3 grams of this new material are obtained as a fine white powder having a melting point of about 111-115° C. which may be further purified if desired.

1.16 parts by weight of the new chemical is incorporated with the base recipe and the stock vulcanized. Tensile data are as follows:

*Tensiles*

Unaged

| Stock | | T | E |
|---|---|---|---|
| Cure | 30'/30# | 4020 | 710 |
| | 45'/30# | 4100 | 680 |
| | 60'/30# | 4340 | 633 |
| | 75'/30# | 4050 | 620 |

*Aged (48 hours in oxygen bomb) (300 lbs. oxygen maintained at 70° C.)*

| Stock | | T | E |
|---|---|---|---|
| Cure | 30'/30# | 3320 | 700 |
| | 45'/30# | 3230 | 656 |
| | 60'/30# | 3190 | 640 |
| | 75'/30# | 3190 | 580 |

Example 8

The zinc salt of 3-mercapto-1-dimethyl benzo-2-4-1-oxazine having the probable formula

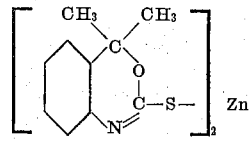

is made as follows:

A solution of 8 grams of 3-mercapto-1-dimethyl benzo-2-4-1 oxazine in 3.4 grams of 50% caustic soda and 50 cc. of water is made up. This solution is mixed with a solution of 35.9 grams of zinc sulphate $(Zn(SO_4) \cdot 7H_2O)$ dissolved in 50 cc. of water. The white precipitate of the zinc salt is filtered off, washed and dried. About 11.3 grams of this new chemical are obtained.

1.18 parts of the new chemical per 100 parts by weight of rubber are added to the base recipe and the stock vulcanized. Tensile data are as follows:

*Tensiles*

Unaged

| Stock | | T | E |
|---|---|---|---|
| Cure | 20'/30# | 3630 | 700 |
| | 30'/30# | 4240 | 676 |
| | 45'/30# | 4240 | 623 |
| | 60'/30# | 4320 | 570 |
| | 75'/30# | 4140 | 563 |

*Aged (48 hours in oxygen bomb) (300 lbs. oxygen maintained at 70° C.)*

| Stock | | T | E |
|---|---|---|---|
| Cure | 20'/30# | 2820 | 683 |
| | 30'/30# | 3140 | 646 |
| | 45'/30# | 3140 | 606 |
| | 60'/30# | 3025 | 550 |
| | 75'/30# | 2760 | 500 |

Example 9

A commercial mixture of 80 parts methyl and 20 parts ethyl amine is used to form the respective amine salts of 3-mercapto-1-dimethyl benzo-2-4-1-oxazine having the following formula:

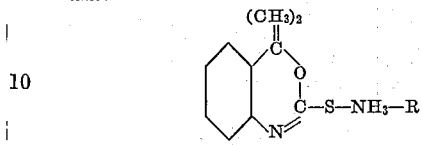

in which R is methyl or ethyl. 13.6 grams of 3-mercapto-1-dimethyl benzo-2-4-1 oxazine are dissolved in a solution of 31 grams of the amine mixture and 85 grams of water. This solution contains about 10.5% of 3-mercapto-1-dimethyl benzo-2-4-1 oxazine in chemical combination with the amines. The salts being water soluble are suitable for accelerating the vulcanization of rubber while in the form of latex. This accelerating solution may be added to a latex composition containing sulphur and zinc oxide or the equivalent thereof and vulcanization carried out by heating the latex composition, or depositing the latex composition in desired form and then vulcanizing the rubber thereof by immersion in water at a suitable temperature or by heating the dried latex composition in an atmosphere of air or steam. Also, deposited latex rubber containing sulphur and zinc oxide may be vulcanized by immersion in a water solution of the accelerators at a suitable temperature, e. g. 190° F., whereby the accelerators diffuse into the rubber.

In general, it is readily apparent from the foregoing data on rubber testing that this new class of rubber accelerators exhibits the broad "plateau effect" in tensile properties throughout the curing range, which is so highly desirable, as well as excellent ageing properties.

These various accelerators may be activated by the use of an organic amine activator. The activator when mixed with the accelerator forms an improved accelerator composition at lower cost. For example a stock such as in Example 2 was made using .292 parts of the accelerator of Example 2 (less than ⅓ the original quantity) together with .5 parts of diphenylguanidine per 100 parts by weight of rubber and the stock when vulcanized gave the following tensiles:

Tensiles

*Unaged*

| Stock | | T | E |
|---|---|---|---|
| Cure | 20'/30# | 1620 | 660 |
| | 30'/30# | 2400 | 686 |
| | 45'/30# | 2790 | 663 |
| | 60'/30# | 3360 | 720 |
| | 75'/30# | 3580 | 710 |

*Aged (48 hours in oxygen bomb) (300 lbs. oxygen maintained at 70° C.)*

| Stock | | T | E |
|---|---|---|---|
| Cure | 20'/30# | 1140 | 543 |
| | 30'/30# | 1580 | 563 |
| | 45'/30# | 2020 | 556 |
| | 60'/30# | 2340 | 606 |
| | 75'/30# | 2230 | 526 |

The system of numbering in the examples given is in accord with the nomenclature employed in Chem. Abstracts index (1916–1926), pages 2,975, 2,981, 5,000, 5,169, 6,241.

Further examples might be given but it is not believed necessary for an understanding of the invention.

Although a plurality of compounds have been named specifically, it is obvious that the claims should not be restricted thereby inasmuch as other compounds coming within the general classification are suggested thereby, for example adjacent carbon atoms of the azine ring, instead of being part of aromatic or aliphatic groups, may be part of alicyclic groups, e. g. cyclohexyl, etc.

Generally basic substituents attached to the heterocyclic nucleus or in the salt or ester forming group tend to reduce the factor of safety against scorching while acidic or negative substituents attached to the heterocyclic nucleus or in the salt or ester forming group tend to increase that factor. The desirability of introducing these various substituents will be governed by the kind and type of cure desired. In many cases it will be found that the type of stock and nature of cure desired governs the use or not of an activator amine and the use or not of a class of accelerator compound devoid of such basic or acidic substituents. In place of the activator zinc oxide, oxides of other metals and their salts may be used as is known in the art. Also in place of zinc salts of higher fatty acids, the higher fatty acids themselves may be used such as stearic, oleic, lauric, etc.

Various compounding ingredients such as fillers, pigments, softeners, anti-oxidants, anti-scorchers, or vulcanization retarders may be employed in practicing the invention. The accelerators may be used in the vulcanization of whole latex rubber or rubber recovered from latex by coagulation or separated from latex by mechanical or centrifugal creaming or chemical creaming methods as will be apparent to those skilled in the art.

The term "rubber" is to be construed broadly as including besides caoutchouc, reclaimed rubbers, gutta percha, balata, synthetic rubber, rubber isomers, etc., as well as natural or artificial rubber latices or aqueous dispersions of rubber. The methods of using the various accelerating agents herein set forth, as to the quantity employed, time of vulcanization, the heat required, and the proportions of metal oxide, sulphur and other ingredients may be varied without departing from the principle of the invention, as hereafter claimed.

Having thus described my invention, what I claim and desire to protect by Letters Patent is:

1. A process of producing vulcanized rubber products which comprises treating rubber with a vulcanizing agent and an azine sulphide vulcanization accelerator, the azine nucleus of which embodies 4 C atoms, 1 N atom and a member of the ozygen-family of the periodic table having an atomic weight of not more than about 32, one of the said carbon atoms of the azine ring being directly intermediate the two hetero atoms and directly linked to a non-nuclear mercapto sulphur atom.

2. A composition comprising rubber and an azine sulphide vulcanization accelerator, the azine nucleus of which embodies 4 C atoms, 1 N atom, and a member of the oxygen-family of the periodic table having an atomic weight of not more than about 32, one of the said carbon atoms of the azine ring being directly intermediate the two hetero atoms and directly linked to a non-nuclear mercapto sulphur atom.

3. A rubber product comprising the vulcanization product of a rubber stock containing prior to complete vulcanization of said stock an azine sulphide vulcanization accelerator, the azine nucleus of which embodies 4 C atoms, 1 N atom and a member of the oxygen-family of the periodic table having an atomic weight of not more than about 32, one of the said carbon atoms of the azine ring being directly intermediate the two hetero atoms and directly linked to a non-nuclear mercapto sulphur atom.

4. A process of producing vulcanized rubber products which comprises treating rubber with a vulcanizing agent and an azine sulphide vulcanization accelerator the azine nucleus of which embodies in ring formation 4 C atoms, 1 N atom and a member of the oxygen-family of the periodic table having an atomic weight of not more than about 32 and in which one of the said nuclear carbon atoms is between the two hetero atoms in the azine nucleus and is attached to a non-nuclear sulphur atom of a mercapto group, and vulcanizing the rubber.

5. A process of producing vulcanized rubber products which comprises treating rubber with a vulcanizing agent and an arylene meta thiazine sulphide in which two adjacent carbon atoms of the arylene nucleus form part of the thiazine ring.

6. A process of producing vulcanized rubber which comprises treating rubber with a vulcanizing agent and an arylene meta oxazine sulphide.

7. A process of producing vulcanized rubber products which comprises treating rubber with a vulcanizing agent and 3-mercapto benzo-2-4-1-thiazine.

8. A process of producing vulcanized rubber products which comprises treating rubber with a vulcanizing agent and 2-mercapto-meta-thiazane.

9. A process of producing vulcanized rubber products which comprises treating rubber with a vulcanizing agent and bis (1-dimethyl benzo-2-4-1-oxazine)-3-disulphide.

10. A compound suitable in the vulcanization of rubber having the formula

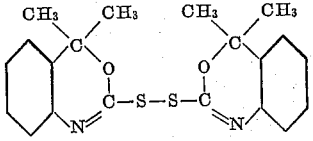

11. A process of producing vulcanized rubber products which comprises incorporating in rubber a vulcanizing agent and a mercapto metathiazine vulcanization accelerator in which the mercapto group is linked to the carbon atom situated directly between the ring nitrogen atom and the ring sulphur atom, and vulcanizing the rubber.

12. A composition comprising rubber and a mercapto metathiazine in which the mercapto group is linked to the carbon atom situated directly between the two hetero atoms of the thiazine ring.

13. A rubber product comprising the vulcanization product of a rubber stock containing a vulcanizing agent and a mercapto metathiazine vulcanization accelerator in which the mercapto group is linked to the carbon atom situated directly between the two hetero atoms of the thiazine ring.

14. A process of producing vulcanized rubber products which comprises incorporating in rubber a vulcanizing agent and a mercapto meta-oxazine vulcanization accelerator in which the mercapto group is linked to the carbon atom situated directly between the ring nitrogen atom and the ring oxygen atom, and vulcanizing the rubber.

15. A composition comprising rubber and a mercapto meta-oxazine in which the mercapto group is linked to the carbon atom situated directly between the two hetero atoms of the oxazine ring.

16. A rubber product comprising the vulcanization product of a rubber stock containing a vulcanizing agent and a mercapto meta-oxazine vulcanization accelerator in which the mercapto group is linked to the carbon atom situated directly between the two hetero atoms of the oxazine ring.

17. A process of producing vulcanized rubber products which comprises incorporating in rubber a vulcanizing agent and a mercapto metathiazine vulcanization accelerator in which the mercapto group is linked to the carbon atom situated directly between the ring nitrogen atom and the ring sulphur atom, and in which adjacent carbon atoms of the azine ring are part of a hydrocarbon group, and vulcanizing the rubber.

18. A composition comprising rubber and a mercapto metathiazine in which the mercapto group is linked to the carbon atom situated directly between the two hetero atoms of the thiazine ring and in which adjacent carbon atoms of the azine ring are part of a hydrocarbon group.

19. A rubber product comprising the vulcanization product of a rubber stock containing a vulcanizing agent and a mercapto metathiazine vulcanization accelerator in which the mercapto group is linked to the carbon atom situated directly between the two hetero atoms of the thiazine ring and in which adjacent carbon atoms of the azine ring are part of a hydrocarbon group.

20. As a new compound, suitable in the vulcanization of rubber, an alkyl-benzo-meta oxazine sulphide.

21. As a new compound, suitable in the vulcanization of rubber, a mercapto-di-alkyl-benzo-meta oxazine.

WILLIAM E. MESSER.